United States Patent [19]

Moskvin

[11] Patent Number: 4,989,445
[45] Date of Patent: Feb. 5, 1991

[54] APPARATUS FOR AUTOMATICALLY METERING MILK DRAWN BY A MILKER

[76] Inventor: Gennady A. Moskvin, Satixmes, 49, kv. 59 SSR, Elgava, U.S.S.R.

[21] Appl. No.: 449,874
[22] PCT Filed: Feb. 21, 1989
[86] PCT No.: PCT/SU89/00049
  § 371 Date: Jan. 5, 1990
  § 102(e) Date: Jan. 5, 1990
[87] PCT Pub. No.: WO89/10685
  PCT Pub. Date: Nov. 16, 1989

[30] Foreign Application Priority Data

May 5, 1988 [SU] U.S.S.R. .............................. 4413031

[51] Int. Cl.⁵ .............................................. G01F 25/00
[52] U.S. Cl. .................................................... 73/3
[58] Field of Search ...................... 73/3, 432.1

[56] References Cited

U.S. PATENT DOCUMENTS 1,830,311 11/1931 Clark .......................................... 73/3
1,855,502  4/1932 Weymouth ................................ 73/3

FOREIGN PATENT DOCUMENTS 1358857 12/1987 U.S.S.R. .

Primary Examiner—Robert Raevis
Attorney, Agent, or Firm—Burgess, Ryan & Wayne

[57] ABSTRACT

An apparatus for automatically metering milk drawn by a milker has a float-type milk meter (1) for metering milk (3) communicating with an evacuated milk pipeline (23) and with an evacuated milk collector (25) which is connected to a vacuum system (27) and to a milk pump (33) which are connected, in turn, to a unit (36) for adjusting the float-type milk meter (1) for milk (3) for an optimum batch of freshly drawn milk (3) from a single cow.

5 Claims, 1 Drawing Sheet

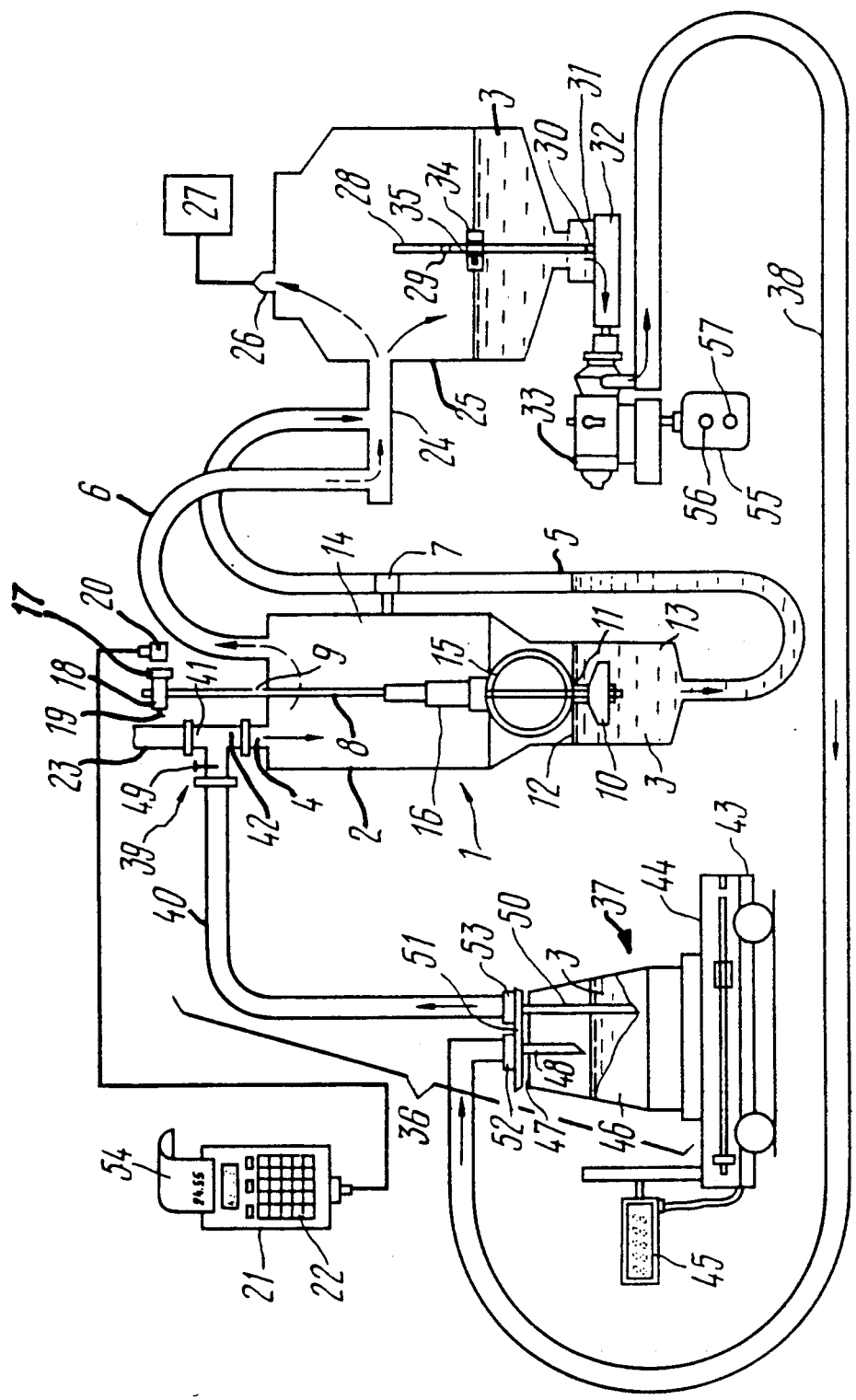

APPARATUS FOR AUTOMATICALLY METERING MILK DRAWN BY A MILKER

FIELD OF THE INVENTION

The invention relates to milkers, and more specifically, it is concerned with apparatuses for automatically metering milk drawn by a milker.

BACKGROUND OF THE INVENTION

For carrying out an effective and planned conduct of a herd of cows with the aim of improving milk output, for determining ration and also for commercial deals with the purchasers, it is necessary to have accurate, reliable and objective information on milk outputs.

The main problem in accurate metering milk at dairy farms is the disagreement between mathematical and physical models of the process of metering of milk output which is caused by differences between ideal and real operating conditions and by the influence of milk properties on accuracy of measurements.

In addition, properties of the fluid being measured—milk—are unique and feature a large scatter of parameters. Specific features of functioning and operation of specific types of milkers and milk meters used also have a substantial effect on accuracy of measurement of milk outputs in milkers so that milk meters should be individually adjusted for optimum metering during milking by milkers. Conventional techniques aimed at enhancing accuracy of metering of milk outputs by optimizing design of a metering chamber of milk meters based on milk mass metering, milk level or milk volume metering in the metering chamber cannot be further improved.

Known in the art is an apparatus for automatically metering milk drawn by a milker, comprising a float-type milk meter having an admission chamber and a metering chamber communicating with each other, a float located in the admission chamber, the float with a valve member being mounted on one and the same hollow rod having an opening in the upper portion extending outside the admission chamber and an open bottom end, the rod cooperating with a means for recording milk quantity, and the metering chamber of the milk meter communicating with an evacuated milker pipeline through an outlet pipe (SU, A, 657260).

In this apparatus, when the metering chamber of the milk meter is filled with milk during milking, milk is admitted through an opening in a partition from the metering chamber to the admission chamber. As a result of the rise of milk level in the admission chamber the float with the rod and valve member surfaces to the filling level of the admission chamber, and the valve member shuts off the opening of the partition. The upper portion of the hollow rod protrudes outside the admission chamber, and the metering chamber communicates with atmosphere through the opening and the interior space of the rod. Owing to a pressure differential, milk is displaced from the metering chamber into the evacuated milk pipeline through the outlet pipe. The rod with the float and valve member transmits the float rise force to a recording means which records a batch of milk at the upper point of the rod rise and the rod then moves down under gravity so that the process of metering and recording of individual batches can be automatically repeated.

This apparatus works with a large error of metering of individual milk batches metered by the metering chamber of the milk meter as a substantial error appears in the measurement of individual batches of milk because of a faulty method of contact recording by transmitting mechanical force from the rod after the rise of the float when the chamber is filled up with milk to the milk quantity recording means.

The number of actuations of the valve member provided on the float rod is thus automatically counted, rather than the actual quantity of milk metered by the metering chamber. The ratio of the number of actuations of the valve of the milk metering chamber to the number of batches of the milk cannot be recorded in this apparatus so that accuracy of this apparatus is rather low.

Known in the art is an apparatus for automatically metering milk drawn by a milker—electronic milk meter "Surge" designed for automatic dairy farms controlled by means of an automatic system "Diary Manager", comprising an admission chamber and a metering chamber for milk separated by a partition, a rod carrying a valve member in the metering chamber and a float in the admission chamber, and a counter means for recording milk batches drawn by the milker (Babson Bros. Co. USA. "Surge", 1987).

Individual milk batches are recorded by this apparatus also by means of the valve member in the metering chamber as it is filled up with milk during cow milking. The float acts mechanically upon the counter means of the milk meter thus introducing an error in measurement of individual batches of milk.

Known in the art is an apparatus for automatically metering milk drawn by a milker, comprising a float-type milk meter having an admission chamber communicating with an evacuated milk pipeline through an inlet pipe, the admission chamber and the metering chamber communicating with each other communicating through outlet pipes with evacuated milk collector of the milker which is connected to a vacuum plant of the milker and with a milk pump of the milker, the chambers accommodating a hollow rod having a valve member at the bottom end thereof and a magnet at the upper end thereof cooperating during movement of the rod with hermetically sealed contacts electrically coupled to a digital computer unit for recording quantity of milk drawn by the milker (SU, A, 1345059).

This apparatus takes into account properties of the fluid being metered—milk—by putting coefficients of correction of readings of the milk meter in the memory of the computer unit in accordance with deviations of its actual readings from the reference batch of milk drawn by the milker.

As a result, accuracy of determination of quantity of milk in this apparatus substantially depends on sample size of milked quantity for which the apparatus is adjusted. Since the sample size during the real milking process is always a random value (the total milk output cannot be determined in advance) an error of readings is caused by the difference between the results of accurate adjustment of the apparatus for a preset sample size and the actual sample size of freshly drawn milk obtained by metering individual batches of milk thus lowering confidence of metering and accuracy.

SUMMARY OF THE INVENTION

The invention is based on the problem of providing an apparatus for automatically metering milk drawn by a milker which has such a means for controlling milk metering process which allows optimum capacity of the metering chamber of a float-type milk meter to be digitally simulated in accordance with physical model under actual operating conditions of the apparatus within the necessary sample size so as to enhance accuracy and confidence of milk metering results.

This is accomplished by providing in an apparatus for automatically metering milk drawn by a milker, a float-type milk meter having an admission chamber communicating through an inlet pipe with an evacuated milk pipeline of the milker, wherein the admission chamber and a metering chamber communicating therewith communicate with an evacuated milk collector of the milker connected to a vacuum system of the milker and to a milk pump of the milker, and a hollow rod acommodated in the chambers having a valve member at the lower end thereof and a magnet at the upper end thereof cooperating during movement of the rod with a hermetically sealed contact electrically coupled to an electronic digital computer unit for recording quantity of milk drawn by the milker. According to the invention, there is provided a unit for adjusting the flow-type milk meter for an optimum batch of freshly drawn milk from a single cow connected to the milk pump.

The unit for adjusting the float-type milk meter for an optimum batch of freshly drawn milk from a single cow preferably comprises a means for measuring the reference mass of freshly drawn milk from a single cow communicating with the milk pump through an individual pipeline.

The means for measuring the reference mass of freshly drawn milk from a single cow preferably comprises a trolley carrying a weighing machine, a milk metering vessel communicating with atmosphere and mounted on the weighing machine and a device for discharging freshly drawn milk into the metering chamber from the individual pipe-line connecting this means to the milk pump, the device being partly received in the metering chamber and partly extending outside thereof and rigidly secured thereabove.

The unit for adjusting the float milk meter for an optimum batch of freshly drawn milk from a single cow may also comprise a means for repeated metering of the reference batches of freshly drawn milk from a single cow communicating through individual pipelines with the means for metering the reference batch of freshly drawn milk from a single cow, with the evacuated milk pipeline and with the admission chamber of the float-type milk meter, respectively.

The means for repeated metering of the reference batches of freshly drawn milk from a single cow preferably comprises a two-position control member provided in the individual pipe-line connecting this means to the means for metering the reference mass of freshly drawn milk from a single cow and an intake device for taking freshly drawn milk from the metering chamber of the metering means connected to the pipeline incorporating the two-position control member which is partly received in the metering chamber and partly extending outside thereof and rigidly secured thereabove.

This constuction of the apparatus for automatically metering milk drawn by a milker ensures high accuracy of measurement and confidence of results of metering of milk drawn by a milker so as to enhance efficiency and accuracy of zootechnical, veterinary and selection operations in a cow herd, contribute to its enhanced productivity and lower labour effort for operation and metrological control of milk meters and facilitate commercial dealings between dairy farm personnel and purchasers.

BRIEF DESCRIPTION OF THE DRAWINGS

The invention will now be described with reference to a specific embodiment illustrated in the accompanying drawing which shows a functional diagram of an apparatus for automatically metering milk drawn by a milker according to the invention.

BEST MODE OF CARRYING OUT THE INVENTION

An apparatus for automatically metering milk drawn by a milker according to the invention comprises a float-type milk meter 1.

The float-type milk meter 1 comprises a casing 2 to be filled with milk 3. The casing 2 has an inlet pipe 4 and two outlet pipes 5 and 6 of which one pipe 5 is rigidly secured to the casing 2 by means of a bracket 7. The casing 2 accommodates a hollow rod 8 partly received in the casing 2 and partly extending outside thereof, having an opening 9 in the body thereof for establishing communication of the interior space of the rod 8 with atmosphere when the rod is raised to bring the opening 9 to a position outside the casing 2. Mounted at the lower end of the rod 8 is a valve member 10 immersed in milk 3 and adapted to shut off an opening 11 in a partition 12 dividing the interior space of the casing 2 into two communicating chambers: a metering chamber 13 and an admission chamber 14. The metering chamber 13 is filled up with milk 3 and accommodates the valve member 10, and the admission chamber 14 is filled with milk 3 at about one-half of its capacity. The intermediate part of the rod 8 located in the admission chamber 14 carries a float 15 with a weight 16. The rod 8 carries at its upper end extending outside the admission chamber 14 of the casing 2 a magnet 17 secured to a bushing 18 which is mounted on the rod 8 for movement therealong by means of a screw 19.

During movement of the rod 8, the magnet 17 cooperates with a hermetically sealed contact 20 electrically coupled to a digital electronic computer unit 21 for recording milk quantity having a control board 22.

The inlet pipe 4 of the admission chamber 14 of the casing 2 of the milk meter 1 is connected to an evacuated milk pipeline 23 of the milker. The entire milker is not shown in the drawing as it does not have material bearing on this invention. The drawing shows individual components of the milker which are necessary for illustrating links and functions of the apparatus according to the invention. Any milker well known to those skilled in the art may be used for the purposes of this invention.

The outlet pipes 5 and 6 of the metering chamber 13 and admission chamber 14 of the casing 2 of the milk meter 1 communicate with an inlet pipe 24 of an evacuated milk collector 25 of the milker. The milk collector 25 communicates through an outlet pipe 26 with a vacuum system 27 of the milker. A part of the interior space of the milk collector 25 is filled with milk 3. The milk collector 25 accommodates a hollow rod 28 made of a nonmagnetic material which accommodates hermetically sealed contacts 29 and 30 for automatically turning on and off milk flow directed through a discharge pipe 31 of the milk collector 25 and a pipeline 32 to a milk pump 33 as the milk collector 25 is filled with milk 3 which results in a float 34 carrying a magnet 35 cooperating with the hermetically sealed contacts 29 and 30 being raised on the rod 28, the hermetically sealed contacts being connected in series in an electric circuit controlling the milk pump 33.

In this embodiment of the apparatus according to the invention there is provided a unit 36 for adjusting the float milk meter for an optimum batch of milk freshly drawn from a single cow connected to the milk pump 33.

The adjusting unit 36 comprises a means 37 for measuring the reference batch of freshly drawn milk from a single cow communicating through an individual pipeline 38 which is in the form of a flexible hose in this embodiment with the milk pump 33, and a means 39 for repeatedly measuring the reference batches of freshly drawn milk from a single cow communicating through individual pipelines 40, 41, 42 with the means for measuring the reference mass of freshly drawn milk from a single cow, with the evacuated milk pipeline 23, and with the admission chamber 14 of the float-type milk meter 1, respectively, so as to allow digital simulation of optimum batches of milk, repeated recording of milk outputs and control of their accuracy by evaluating samples of statistical observations under actual operating conditions to be carried out, as well as comparison of results of individual measurements of milk outputs with one another and with the reference batch of milk drawn from a single cow thus enhancing confidence of the results. In addition, the digital simulation of optimum batches of milk under actual operating conditions of the milker makes it possible to take into account properties of the fluid being metered—milk—as well in comparison with properties of the reference batch of freshly drawn milk from a single cow and to take into account structural features of the milk meter used by correcting the results.

The means 37 for measuring the reference mass of freshly drawn milk from a single cow comprises a trolley 43 carrying a weighing machine 44 having an electronic digital indicator 45 of the mass of freshly drawn milk having a scale division which is maximum 1/6 of the permissible tolerance range of a preset accuracy of measurement of milk quantity (in accordance with zootechnical, veterinary and selection requirements imposed upon milk metering). Mounted on the weighing machine 44 is a metering chamber 46 filled with milk 3 and communicating with atmosphere, i.e. open at its end 47.

The means 37 also has a device 48 adapted for discharging freshly drawn milk into the metering chamber 46 from the pipeline 38 which is partly received in the vessel 46 and partly extends outside thereof.

The means 29 for repeatedly measuring the reference batches of freshly drawn milk from a single cow comprises a two-position control member 49 which is in the form of a valve in this embodiment incorporated in the pipeline 40 and an intake device 50 for taking freshly drawn milk from the chamber 46 connected to the pipeline 40 and partly received in the metering chamber 46 and partly extending outside thereof. An end plate 51 is provided on the side of the end 47 of the chamber 46 which is spaced therefrom. The devices 48 and 50 which are in the form of tubes with bevel cuts at the ends thereof extend through the end plate 51. The devices 48 and 50 are secured to the end plate 50 by means of nuts 52 and 53 and connected to the pipelines 38 and 40, respectively, which are rigidly secured in the immediate vicinity to the zone where they are connected to the devices 48 and 50 (not shown in the drawing). All this ensures the free position of the devices 48 and 50 in the interior space of the metering chamber 46 without a direct contact therewith, the device 50 being lowered to the base of the vessel 46 without, however, touching it.

The apparatus for automatically metering milk according to the invention functions in the following manner.

A solid arrow in the accompanying drawing shows the admission of milk and a dotted arrow shows the admissions of air.

Operation of the apparatus for automatically metering milk drawn by a milker consists of two stages: a preliminary stage and the main stage.

During the preliminary stage, the actual process of milking is simulated for carrying out the adjustment of the float type milk meter 1 for an optimum batch in accordance with the reference batch of freshly drawn milk from a single cow. For that purpose, milk freshly drawn from a single cow is placed into the metering chamber 46 and weighed on the weighing machine 44, and the value of the reference mass of freshly drawn milk is recorded by the electronic digital indicator 45 with an accuracy of at least 1/6 of the permissible tolerance range of a preset accuracy of metering. The electronic computer unit 21 is then switched on and the numerical value of the batch of milk 3 in the metering chamber 13 of the float-type meter 1 is put into the computer unit memory.

The control member 49 is then turned on, and the interior space of the metering vessel 46 filled with freshly drawn milk 3 is connected to the evacuated milk pipeline 23 of the milker through the individual pipelines 40, 41, 42 and the intake device 50 for taking milk. As a result of the difference between atmospheric pressure in the metering chamber 46 and vacuumetric pressure in the evacuated milk pipeline 23 of the milker, the freshly drawn milk 3 is transferred from the metering chamber 46 through the milk intake device 50, individual pipelines 40 and 42 into the admission chamber 14 and metering chamber 13 of the float-type milk meter 1.

The chambers 13 and 14 are filled with milk 3 at a rate of its supply corresponding to the actual flow of milk during milking by means of the milker. The desired rate of supply of milk 3 to the milk meter is adjusted for an optimum batches at the stage of simulation and adjustment of the milk meter 1 by means of the control member 49. As the chambers 13 and 14 of the milk meter 1 are filled with milk, the float 15 with the rod 8 and weight 16 designed for adjusting buoyancy of the float 15 and with the value member 10 and bushing 17 carrying the magnet 17 adjustable on the rod 8 by means of the screw 19 is raised. When the admission chamber 14 of the milk meter 1 is filled at about one-half of its capacity with milk 3, the valve member 10 shuts off the opening 11 of the partition 12.

The opening 9 of the rod 8 is thus moved to a position outside the admission chamber 14 of the milk meter 1 so that atmospheric pressure of air through the opening 9 and the interior space of the rod 8 and the open lower end of the rod 8 displaces a batch of milk 3 from the metering chamber 13 through the outlet pipe 5 of the milk meter 1 and the inlet pipe 24 into the evacuated milk collector 25. The air, gas and liquid components of freshly drawn milk 3 are thus separated as the air and gas component is removed through the individual pipeline 42, outlet pipe 6 of the admission chamber 14 of the milk meter 1, inlet pipe 24 of the milk collector 25, and the outlet pipe 26 into the vacuum system 27 of the milker.

When the rod 8 reaches the uppermost position in the admission chamber 14, the field of the magnet 17 closes the hermetically sealed contact 20, and the batch of milk 3 is recorded by the unit 21. The current result of addition of individual batches of milk 3 is displayed on the digital indicator of the unit 21, and the total result of measurement of the drawn milk is recorded on a chart paper 54.

After the delivery of the batch of milk 3 and its transfer into the milk collector 25, the metering chamber 13 of the milk meter 1 is emptied and filled with air under atmospheric pressure. As a result, the rod 8 moves down under gravity thereof and of the members carried thereon and under the action of the pressure differential between the admission chamber 14 and metering chamber 13, and the opening 9 of the rod 8 is moved to a position within the admission chamber 14 so that pressures in the chambers 13 and 14 become equal to each other.

A new batch of freshly drawn milk 3 fills the metering chamber 13, and the process of metering of individual batches of freshly drawn milk 3 is automatically repeated until all milk 3 supplied from the metering chamber 46 passes through the milk meter 1.

When the preliminary stage of metering of individual batches of reference quantities of freshly drawn milk 3 is over, the readings of the electronic digital indicator 45 of the weighing machine 44 are compared with the readings on the chart paper 54 of the electronic computer unit 21 so as to determine on the basis of the difference between the readings, an optimum batch of freshly drawn milk metered by the float milk meter 1.

To ensure the desired sample size in carrying out measurements of the reference batch of freshly drawn milk 3 during the preliminary stage of adjustment of the milk meter 1 for optimum batches, the abovedescribed operations are repeated to collect a file of statistical data so as to ensure confidence of measurement results obtained at the preliminary stage.

As every cycle of measurement at this stage aimed at determining an optimum batch for the float-type milk meter 1 is completed the value of the batch is gradually revised by means of the electronic computer unit 21 and the control board 22 in accordance with built-in programs and correction algorithms.

The repeated measurements are carried as follows.

The reference quantity of freshly drawn milk from a single cow is collected in the evacuated milk collector 25 upon completion of the first cycle of measurement of individual batches of milk 3 by means of the milk meter 1 as described above. It should be noted that owing to the provision in the milk collector 25 of the rod 28 of a nonmagnetic material which accommodates the hermetically sealed contacts 29, 30, the float 34 carrying the magnet 35 reaches the upper filling level of the milk collector 25 of freshly drawn milk 3 from a single cow at which the hermetically sealed contact 29 is located in the rod 28. As a result of the action of the field of the magnet 35 upon the hermetically sealed contact 29, the latter closes the control circuit of the milk pump 33, and milk 3 is fed through the discharge pipe 31 of the milk collector 25, pipeline 32, milk pump 33, individual pipeline 38, and discharge device 48 into the metering chamber 46 mounted on the weighing machine 44 having the electronic digital indicator 45 of the reference mass of freshly drawn milk contained in the metering chamber 46.

The freshly drawn milk 3 is fed from the milk collector 25 continually by means of the milk pump 33 until the level of milk 3 in the milk collector 25 reaches the level of the hermetically sealed contact 30. The field of the magnet 35 acts upon the hermetically sealed contact 30 which breakes the control circuit of the milk pump 33, and the cycle is repeated until the desired sample size is achieved during repeated measurements of the reference mass of freshly drawn milk from a single cow. A control board 55 having start and stop pushbuttons 56 and 57, respectively, is provided for turning the pump 33 on and off.

The preliminary stage supplies to the electronic computer unit 21 optimum confident batches freshly-drawn milk actually metered by the float-type milk meter 1, this signal being then put into the memory of the unit 21.

The preliminary stage of adjustment of the milk meter 1 for an optimum batch is completed when the control member 49 shuts off the individual pipeline 40 and the interior spaces of the metering chamber 46 and chambers 14 and 13 of the meter 1 do not communicate with one another.

The main stage of operation of the apparatus for automatically metering milk drawn by a milker is completely identical to the preliminary stage of operation of the float-type milk meter 1. The unit 36 for adjusting the meter 1 for an optimum batch of milk 3 drawn from a single cow does not take part in the process as this unit 36 is blocked by the control member 49. The weighing machine 44 and the metering chamber 46 are removed by the trolley 43 to a point outside the working zone of the milk meter 1 for storage until the next adjustment of the float-type milk meter 1 and repeated measurements. The pipelines 40 and 38 may be dismantled by means of nuts 52 and 53, respectively, for cleaning.

During milking of cows in the main stage operating mode of the milk meter 1, the individual pipeline 38 is disconnected from the milk pump 33, and a pipeline is connected to the pump (not shown) for supplying the drawn milk to a cooler or for primary treatment of the milk in accordance with the procedure adopted at the dairy farm.

The apparatus according to the invention is a representative of a new and promising type of milk output meters of an "intellectual" type which can be used with any conventional milker.

The provision of a measuring channel "float-type milk meter—electronic computer unit" in the milkers enlarges operating and functional capabilities of the apparatus.

The apparatus according to the invention features integrated processes of adjustment, testing and operation of milk meters under actual operating conditions so as to enhance accuracy of metering of milk at milkers.

The provision of the adjustment unit in the apparatus according to the invention makes it possible for the first time to mate mathematical and physical models of milk metering processes under actual operating conditions taking into account properties of the fluid being metered and actual functional and technical condition of the milker as to ensure high reliability and confidence of metering results.

The apparatus according to the invention is simple in operation.

INDUSTRIAL APPLICABILITY

The apparatus for metering milk drawn by a milker may be used in any conventional milker collecting milk drawn from one cow or from a group of cows where milk quantity is to be determined. Accurate information on quantity of drawn milk obtained by means of the apparatus according to the invention may be used in automatic dairy control systems for preparing rational cow diets in accordance with milk outputs, for planned zootechnical, veterinary and selection operations aimed at increasing milk outputs as a result of a more complete utilization of the genetic potential of each cow in respect of output. The accurate control of operations with cows is ensured in the apparatus according to the invention owing to the accurate primary data on milk outputs.

I claim:

1. An apparatus for automatically metering milk drawn by a milker, comprising a float-type milk meter (1) for metering milk (3) having an admission chamber (14) communicating through an inlet pipe (4) with an evacuated milk pipeline (23) of the milker, the admission chamber (14) and a metering chamber (13) communicating therewith communicating through outlet pipes (6, 5) with an evacuated milk collector (25) of the milker connected to a vacuum system (27) of the milker and with a milk pump (33) of the milker and accommodating a hollow rod (8) carrying a valve member (10) at the lower end thereof and a magnet (17) at the upper end thereof cooperating during movement of the rod (8) with a hermetically sealed contact (20) electrically coupled to an electronic digital computer unit (21) for recording a quantity of milk (3) drawn by the milker, and a unit (36) for adjusting the float-type milk meter (1) for metering milk (3) for an optimum batch of freshly drawn milk (3) from a single cow connected to the milk pump (33).

2. An apparatus according to claim 1, wherein the unit (36) for adjusting the float-type milk meter (1) for metering milk (3) for an optimum batch of freshly drawn milk (3) from a single cow comprises a means (37) for measuring the reference mass of freshly drawn milk (3) from a single cow which communicates with the milk pump (33) through an individual pipeline (38).

3. An apparatus according to claim 2, wherein the means (37) for measuring the reference mass of freshly drawn milk from a single cow comprises a trolley (43) carrying a weighing machine (44), a metering chamber (46) for the milk (3) communicating with atmosphere and mounted on the weighing machine (44), and a device (48) for discharging the freshly drawn milk (3) into the metering chamber (46) from the individual pipeline (38) which connects the means (37) to the milk pump (33), the discharge device being partly received in the metering chamber (46) and partly extending outside thereof and rigidly secured thereabove.

4. An apparatus according to claim 1, wherein the unit (36) for adjusting the float-type milk meter (1) of milk (3) for an optimum batch of freshly drawn milk (3) from a single cow further comprises a means (39) for repeatedly measuring the reference batches of freshly drawn milk (3) from a single cow communicating through individual pipelines (40, 41, 42) with the means for measuring the reference mass of freshly drawn milk (3) from a single cow, with the evacuated milk pipeline (23) and with the admission chamber (14) of the float-type milk meter (1) for metering milk (3), respectively.

5. An apparatus according to claim 4, wherein the means (39) for repeatedly measuring the reference batches of freshly drawn milk (3) from a single cow comprises a two-position control member (49) provided in the individual pipeline (40) connecting the means (39) with the means (37) for measuring the reference mass of freshly drawn milk (3) from a single cow, and an intake (50) for taking freshly drawn milk (3) from a metering chamber (46) of the measurement means (37) connected to the pipeline (40) incorporating the two-position control member (49), the intake device (50) being partly received in the metering chamber (46) and partly extending outside thereof and rigidly secured thereabove.

* * * * *